US011155029B2

(12) United States Patent
White et al.

(10) Patent No.: US 11,155,029 B2
(45) Date of Patent: Oct. 26, 2021

(54) THREE DIMENSIONAL (3D) PRINTING USING FUSING AND DETAILING AGENTS

(71) Applicant: HEWLETT-PACKARD DEVELOPMENT COMPANY, L.P., Houston, TX (US)

(72) Inventors: Scott A. White, Boise, ID (US); Justin M. Roman, Vancouver, WA (US); Xavier Alonso Becerro, Sant Cugat del Valles (ES); Ismael Chanclon Fernandez, Sant Cugat del Valles (ES); Samuel A. Stodder, San Diego, CA (US); Glenn Thomas Haddick, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 141 days.

(21) Appl. No.: 16/093,108

(22) PCT Filed: May 12, 2016

(86) PCT No.: PCT/US2016/032193
§ 371 (c)(1),
(2) Date: Oct. 11, 2018

(87) PCT Pub. No.: WO2017/196353
PCT Pub. Date: Nov. 16, 2017

(65) Prior Publication Data
US 2019/0176390 A1 Jun. 13, 2019

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/171* (2017.08); *B29C 67/0044* (2013.01);
(Continued)

(58) Field of Classification Search
CPC . B29C 64/165; B29C 64/171; B29C 67/0044; B29C 64/291; B33Y 10/00; B33Y 30/00; B33Y 50/02
See application file for complete search history.

(56) References Cited

U.S. PATENT DOCUMENTS

| 5,252,264 A | 10/1993 | Forderhase et al. |
| 6,113,696 A | 9/2000 | Tseng |

(Continued)

FOREIGN PATENT DOCUMENTS

| JP | 2005-319634 | 11/2005 |
| JP | 2005319634 | 11/2005 |

(Continued)

OTHER PUBLICATIONS

Monica; "How Does 3D Support Structures Help in 3D Printing?"; 3D Printing, Blog; Nov. 21, 2015; http://www.juic3dit.com/how-does-3d-support-structures-help-in-3d-printing. (cont. from above) http://www.juic3dit.com/how-does-3d-support-structures-help-in-3d-printing/.

*Primary Examiner* — Bernard G Lindsay
(74) *Attorney, Agent, or Firm* — HP Inc. Patent Department (57) ABSTRACT

A method of three-dimensional (3D) printing is provided. Print data is received, which defines patterns of at least one agent to be applied to a layer of build material. The print data is modified to add a further pattern of a detailing agent to be selectively applied to the layer of build material to generate fracture regions in a processed volume of build material.

20 Claims, 7 Drawing Sheets

(51) Int. Cl.
*B33Y 30/00* (2015.01)
*B29C 64/171* (2017.01)
*B29C 67/00* (2017.01)
B33Y 50/02 (2015.01)
B29C 64/291 (2017.01)
B33Y 40/00 (2020.01)

(52) U.S. Cl.
CPC ............... *B33Y 10/00* (2014.12); *B33Y 30/00* (2014.12); *B29C 64/291* (2017.08); *B33Y 40/00* (2014.12); *B33Y 50/02* (2014.12)

(56) References Cited

U.S. PATENT DOCUMENTS

| | | | |
|---|---|---|---|
| 6,147,138 A * | 11/2000 | Hochsmann | B33Y 80/00 523/139 |
| 6,589,471 B1 * | 7/2003 | Khoshnevis | B33Y 10/00 264/497 |
| 7,807,077 B2 | 10/2010 | Hochsmann et al. | |
| 2004/0239009 A1 * | 12/2004 | Collins | B29C 64/40 264/497 |
| 2004/0251574 A1 * | 12/2004 | Collins | B29C 64/165 264/113 |
| 2007/0241482 A1 * | 10/2007 | Giller | G03G 15/224 264/494 |
| 2011/0143108 A1 * | 6/2011 | Fruth | B29C 64/188 428/198 |
| 2012/0100031 A1 | 4/2012 | Ljungblad | |
| 2013/0292862 A1 | 11/2013 | Joyce | |
| 2014/0048971 A1 | 2/2014 | Mannella et al. | |
| 2014/0271961 A1 * | 9/2014 | Khoshnevis | C04B 33/04 425/78 |
| 2014/0300017 A1 * | 10/2014 | Wighton | B29C 64/141 264/40.1 |
| 2014/0335313 A1 | 11/2014 | Chou et al. | |
| 2015/0061195 A1 * | 3/2015 | DeFelice | B29C 64/153 264/497 |
| 2015/0258707 A1 | 9/2015 | Hirata | |
| 2015/0360421 A1 * | 12/2015 | Burhop | B33Y 50/02 264/401 |
| 2017/0182711 A1 * | 6/2017 | Ederer | B33Y 10/00 |

FOREIGN PATENT DOCUMENTS

| | | |
|---|---|---|
| WO | WO-2015106816 A1 | 7/2015 |
| WO | WO2015108560 | 7/2015 |
| WO | WO2015167520 | 11/2015 |
| WO | WO-2016053312 A1 | 4/2016 |
| WO | WO-2016068899 A1 | 5/2016 |

* cited by examiner

THREE DIMENSIONAL (3D) PRINTING USING FUSING AND DETAILING AGENTS

BACKGROUND

The description is related to a three dimensional (3D) printing method and system. Three-dimensional (3D) printing is an additive printing process used to make three-dimensional solid objects from a digital model. More particularly, the description is related to a powder based 3D printing method and system.

BRIEF DESCRIPTION OF THE DRAWINGS

Features of examples will be described, by way of example only, in the following detailed description with reference to the accompanying drawings in which like reference numerals correspond to similar, though perhaps not identical, components. For the sake of brevity, reference numerals or features having a previously described function may or may not be described in connection with other drawings in which they appear.

DETAILED DESCRIPTION

In general, 3D printing techniques are considered additive processes because they involve the combined application of successive layers of material. This is unlike machining processes, which rely upon the removal of material to create the final object. Materials used in 3D printing are often subject to fusing, which for some materials may be accomplished using, for example, heat-assisted extrusion, sintering or fusing, and for other materials may be accomplished using digital light projection technology.

Figure 1A:
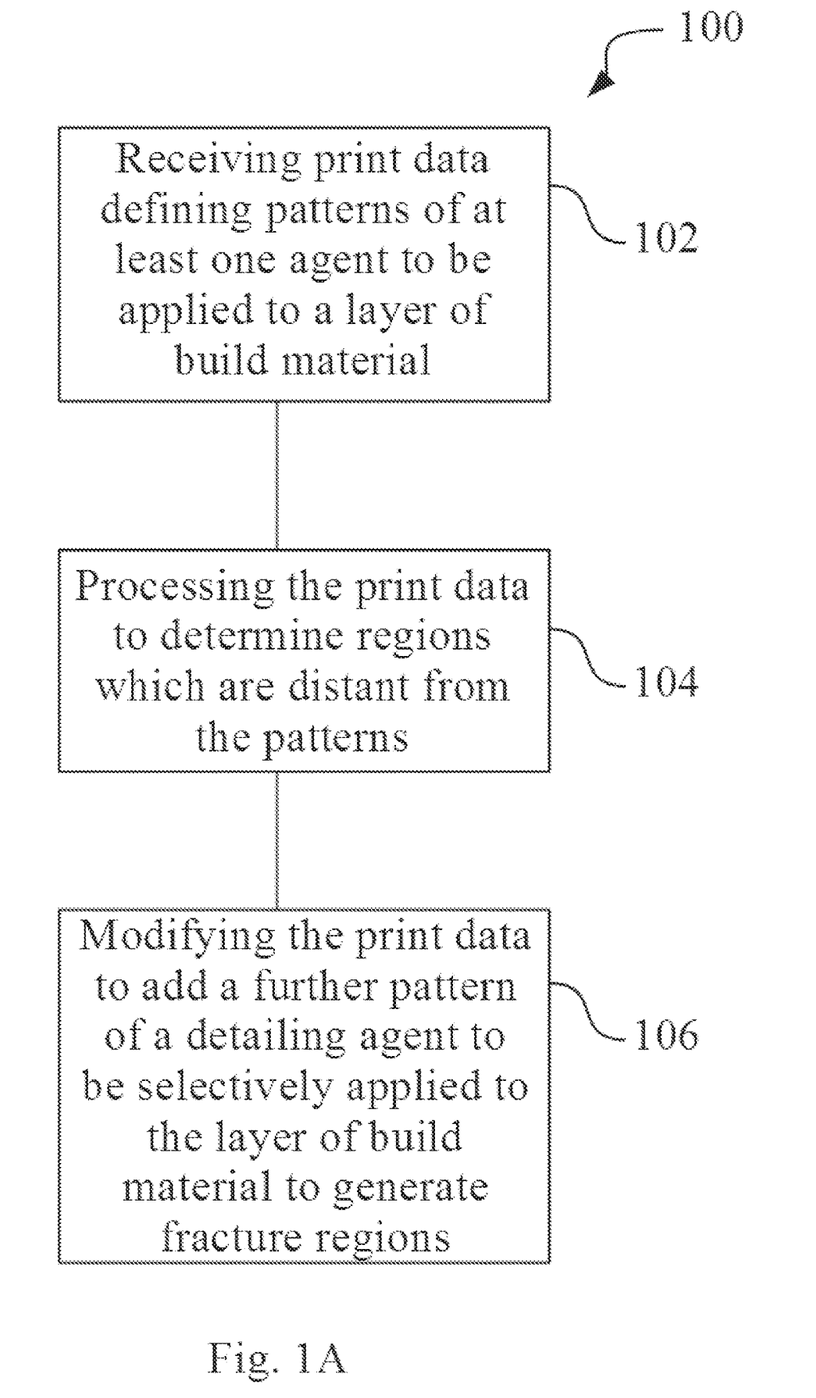
FIGS. 1A and 1B are flow diagrams illustrating examples of 3D printing methods disclosed herein.

An example 3D printing method 100 is depicted in FIG. 1A. It is to be understood that the method 100 shown in FIG. 1A will be discussed in detail herein, and in some instances, FIGS. 2 through 4 will be discussed in conjunction with FIG. 1A.

As shown at reference numeral 102, the method 100 includes receiving print data. In some examples, print data may be data which can be used to control print heads of a 3D printing system. In some examples, the print data may be based on a 3D model of an object to be generated. In some examples, the print data may comprise the 3D model.

In some examples, the print data defines patterns of at least one print agent to be applied to a layer of build material. In some examples, the print agent may be a fusing agent. In some examples, a number of fusing agents are to be applied to the layer of build material. In some examples, the print agents may comprise a number of different agents, such as fusing agents, modifying agents and the like.

In some examples, the patterns of the at least one print agent to be applied to a layer of build material may correspond to cross sections of at least one 3D object to be generated.

As shown at reference numeral 104, the method 100 includes processing the print data. In some examples, processing the print data may include parsing the print data. In some examples, processing the print data is to determine regions which are distant from the patterns of the print agent(s) to be applied to the layer of build material. In some examples, "distant" is to be understood such that the regions are not affected by the patterns of the print agent(s) to be applied to the layer of build material.

In some examples, the distant regions may be determined in 3D space in the 3D model data. In some examples, the distant regions may be determined in 2D space in slice data.

As shown at reference numeral 106, the method 100 further includes modifying the print data to add a further pattern of a detailing agent to be selectively applied to the layer of build material. In some examples, the further pattern may correspond to the distant regions which have been determined.

In some examples, selectively applying a detailing agent is to generate fracture regions in a processed volume of build material. In some examples, the processed volume of build material may be the completed platform after the object(s) have been printed. In some examples, fracture regions may be regions in which fractures occur in the completed platform.

In some examples, the modified print data is to control print heads of a 3D printing system.

Figure 1B:
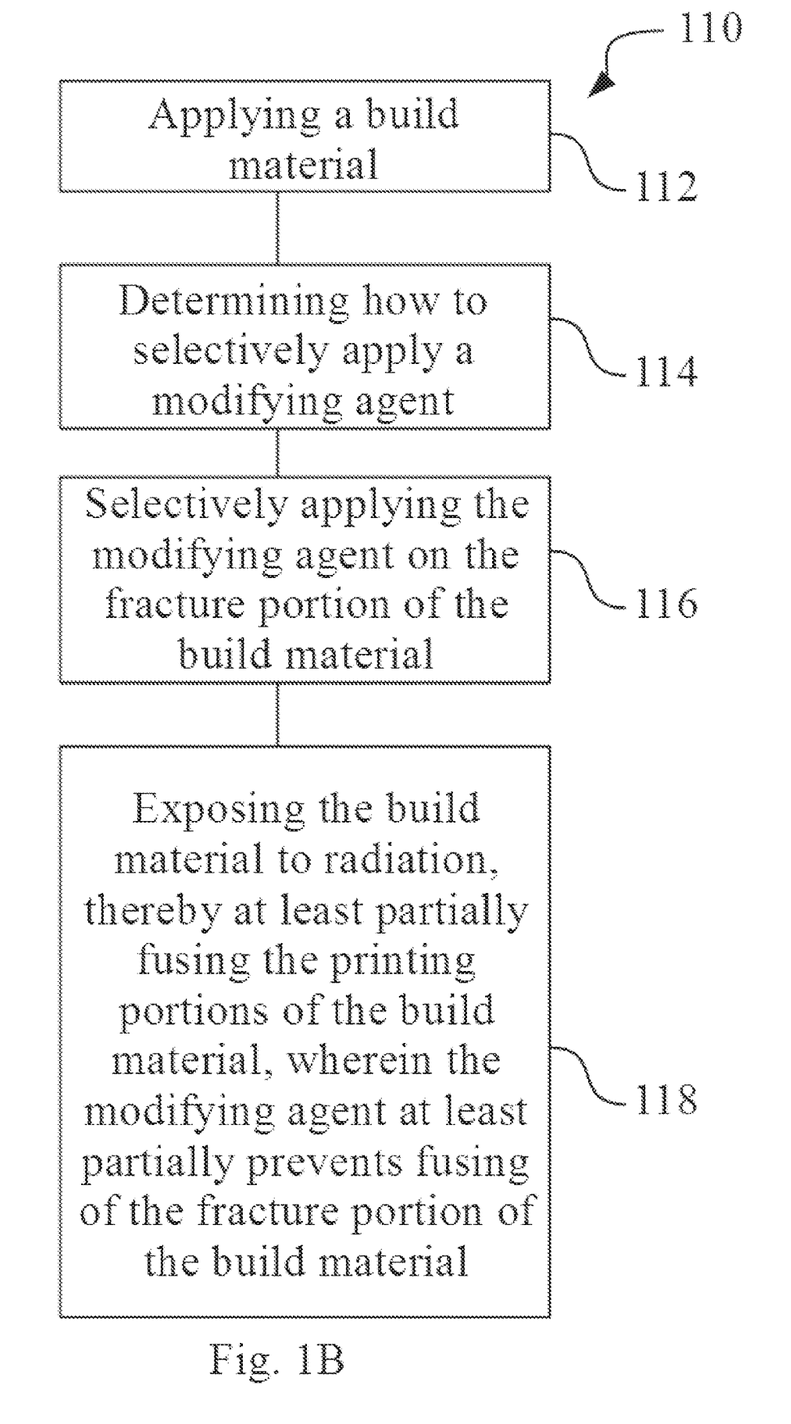

A further example of a 3D printing method 110 is depicted in FIG. 1B. It is to be understood that the method 110 shown in FIG. 1B will be discussed in detail herein, and in some instances, FIGS. 2 through 4 will be discussed in conjunction with FIG. 1B.

As shown at reference numeral 112, the method 110 includes applying a build material. An example of this is shown in cross section at FIG. 2A. In the example shown in FIG. 2A, one layer 10 of the build material 16 has been deposited, as will be discussed in more detail below.

The build material 16 may be a powder, a paste, a gel or a composition thereof. Some examples of build material 16 may include semi-crystalline thermoplastic materials. Some specific examples of the build material 16 may include polyamides (e.g., nylon). Other specific examples of the build material 16 may include polyethylene, polyethylene terephthalate (PET), and amorphous variations of these materials. Still other examples of suitable build materials 16 may include polymers, such as polystyrene, polyacetals, polypropylene, polycarbonate, and blends of any two or more of these polymers listed herein. Core shell polymer particles of these materials may also be used.

In an example, the build material 16 is a polymeric powder composition. In some examples, the build material 16 may include similarly sized polymer particles (e.g. particles of all the same size). In other examples, the build material 16 may include differently sized polymer particles. For example, the build material 16 may include particles having two or more different sizes, such as three different sizes or a range of sizes. The term "size", as used herein, refers to the diameter of a spherical particle, or the average diameter of a non-spherical particle (i.e. the average of multiple diameters across the particle). In general, the average size of each particle ranges from about 5 micrometers to about 100 micrometers.

Figure 2A:
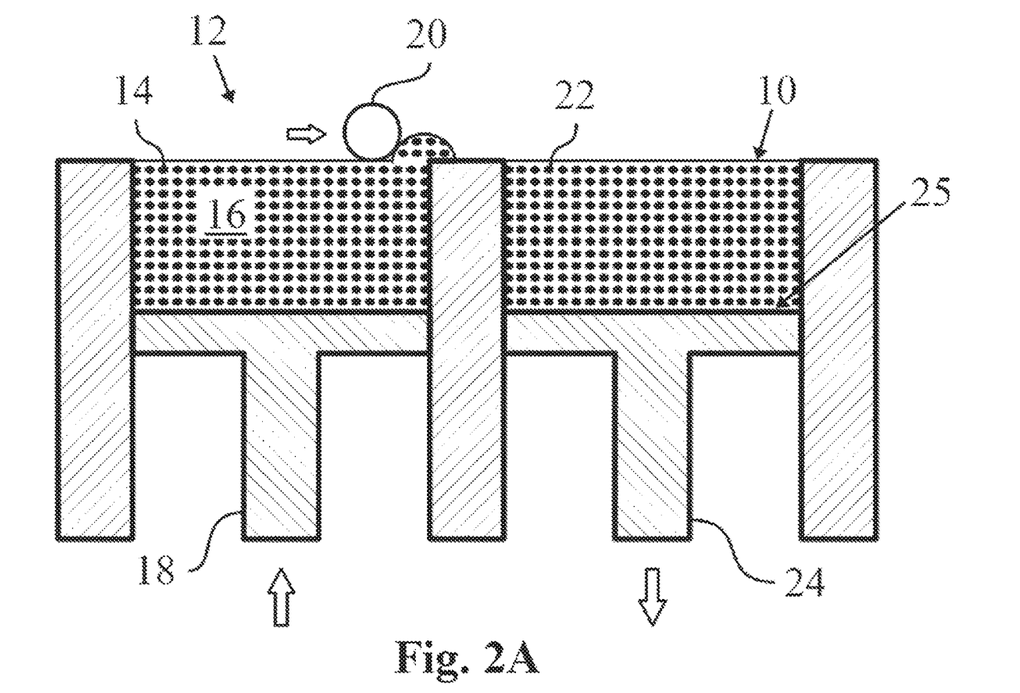
FIGS. 2A through 2F are cross-sectional views of the forming of layer(s) of a 3D object using an example of a 3D printing method disclosed herein.

In the example shown in FIG. 2A, a three-dimension printing or additive manufacturing system 12 which may be used to form three-dimensional (3D) objects includes a supply bed 14 (including a supply of the build material 16), a delivery piston 18, a roller 20, a build platform 25 and a fabrication piston 24. Each of these physical elements may be operatively connected to a central processing unit, such as, e.g., a processor (not shown), of the printing system 12.

The central processing unit (e.g. running computer-readable instructions stored on a non-transitory, tangible computer-readable storage medium) may manipulate and transform data represented as physical (electronic) quantities within the printers registers and memories in order to control the physical elements to create the 3D objects. The data for the selective delivery of the build material 16, and a number of printing agents may be derived from a model of the 3D objects to be formed.

The delivery piston 18 and the fabrication piston 24 may be the same type of piston, but programmed to move in opposite directions. In an example, when a first layer of the 3D objects is to be formed, the delivery piston 18 may be programmed to push a predetermined amount of the build material 16 out of the opening in the supply bed 14, and the fabrication piston 24 may be programmed to move in the opposite direction of the delivery piston 18 in order to increase the depth of the fabrication bed 22. The delivery piston 18 may advance enough so that when the roller 20 pushes the build material 16 into the fabrication bed 22 and onto the contact surface 25, the depth of the fabrication bed 22 is sufficient so that a layer 10 of the build material 16 may be formed in the fabrication bed 22. The roller 20 may be capable of spreading the build material 16 into the fabrication bed 22 to form the layer 10, which is relatively uniform in thickness. In an example, the thickness of the layer 10 ranges from about 90 micrometers to about 110 micrometers, although thinner or thicker layers may also be used.

It is to be understood that the roller 20 may be replaced by other tools, such as, e.g. a blade or the like that may be used for, e.g. spreading different types of powders, or a combination of a roller and a blade.

Figure 2B:
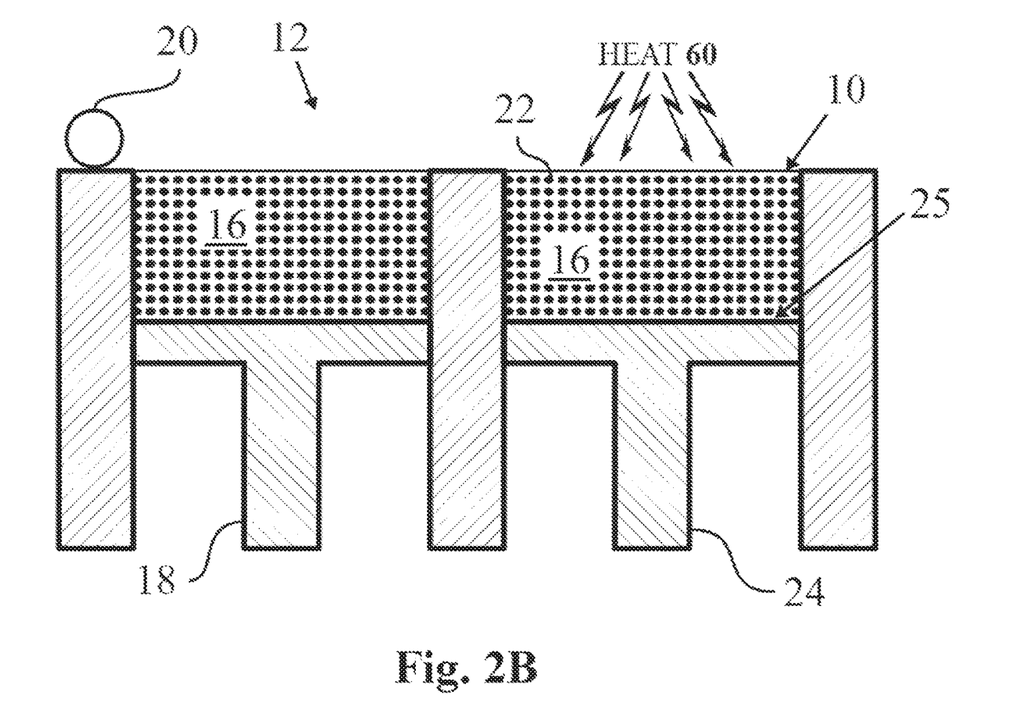

In some examples, after the layer 10 of the build material 16 has been deposited in the fabrication bed 22, the layer 10 may be exposed to heating (as shown in FIG. 2B). Heating may be performed to preheat the build material 16, for example at a heating temperature that is below the melting point of the build material 16.

Preheating the layer 10 of the build material 16 may be accomplished using any suitable heat source that exposes all of the build material 16 in the fabrication bed 22 or the supply bed 14 to the heat. Examples of the heat source may include a thermal heat source or a light radiation source.

In some examples, preheating of the build material 16 may cause the build material 16 to become sticky or more cohesive. In some examples, preheating may cause the build material 16 in the fabrication bed 22 to form a semi-hard cake. That is, in some examples the build material 16 may not be free flowing due to the effects of being preheated.

In some examples, the central processing unit of the system 12, e.g. the processor, may receive print data. In some examples, the print data may include at least one 3D model, i.e. a 3D representation of objects to be printed. In some examples, the print data may include pre-processed slice data, i.e. data that defines each slice to be printed.

In some examples, one 3D object is to be printed and the print data may include a 3D representation of the object to be printed. In some examples, multiple objects are to be printed and the print data may include a 3D representation of the objects to be printed.

In some examples, the 3D model data is parsed to evaluate the objects to be printed in the 3D model data. In some examples, at least one cross section of the object(s) to be printed in the 3D model data is generated for at least one layer 10. In some examples, the cross section(s) are generated for a number of layers 10 or for each layer 10. The cross section(s) correspond to solidification portions 44 for the layer(s) 10. Here, a solidification portion 44 is a portion of build material 16 on which a fusing agent is to be applied.

In some examples, a solidification portion 44 of the layer 10 may be a portion in which the build material 16 is to be solidified, e.g. by fusing, to form a layer of a 3D object.

In some examples, the processor of the system 12 may modify the print data to include the print portions 44 of the objects to be printed. In some examples, the print data is sent to print heads of the system 12. In some examples, the print data may cause the print heads to apply a fusing agent to the solidification portions 44.

In some examples, at least one print head may be controlled to receive commands from the processor and to deposit the fusing agent 28 according to a pattern of a cross section for the layer of the 3D object that is to be formed. As used herein, the cross section of the layer of the object to be formed refers to the cross section that is parallel to the contact surface 25. In some examples, the print head may be controlled to receive modified print data. In some examples, the modified print data may include commands to deposit the fusing agent 28 to solidification portions 44, which correspond to cross sections of the 3D object to be printed for the layer(s) 10.

Figure 2C:
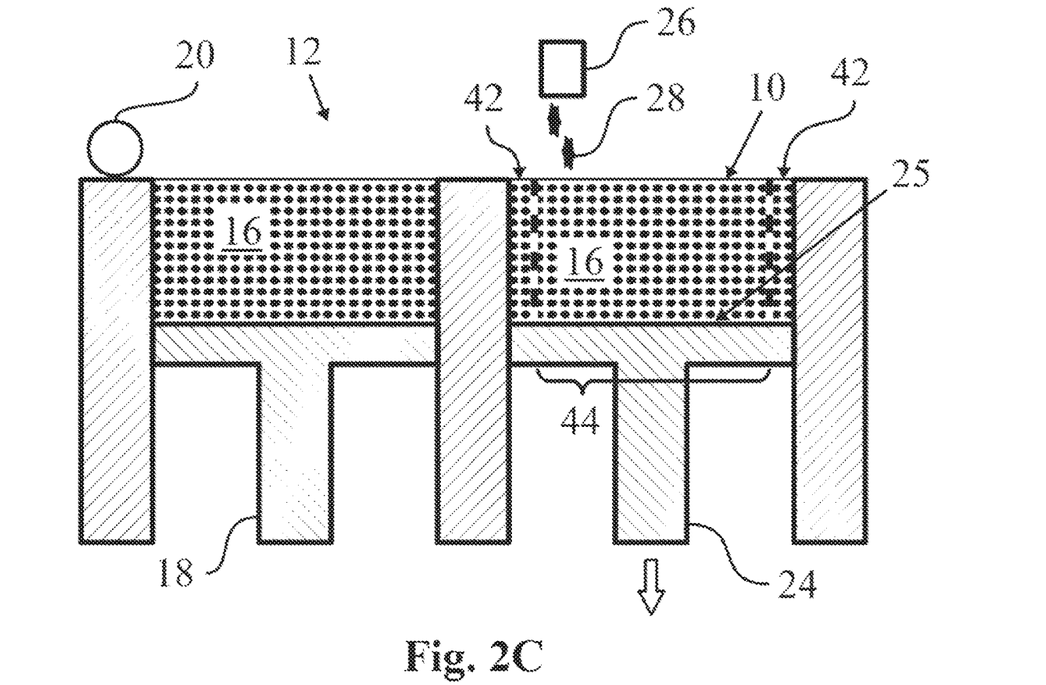

In some examples, a fusing agent 28 may be selectively applied on at least one solidification portion 44 of the build material 16 in the layer 10 in the fabrication bed 22, as shown in FIG. 2C. The solidification portions 44 of the build material may correspond to the cross sections of the objects to be printed in the layer 10. For example, the solidification portion 44 may have a circular or rectangular shape, respectively, corresponding to the cross section of a circular cylinder or a rectangular prism, respectively (cf. FIG. 3).

The print head may be controlled to selectively apply, in accordance with print data, the fusing agent 28 on those portions 44 of the layer 10 that are to be fused to become the first layer of the 3D objects. When the term fused is used herein, it may mean curing, sintering, fusing, binding or the like.

Figure 2D:
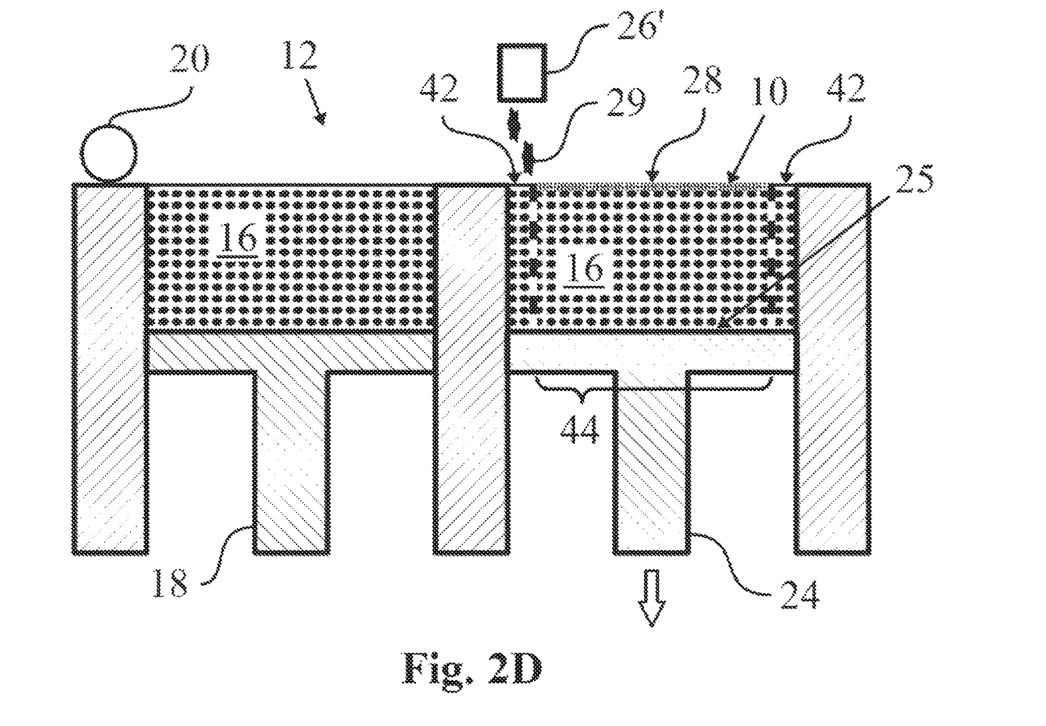

As illustrated in FIG. 2D, the fusing agent 28 may be dispensed from a fusing agent distributor 26, such as a print head, e.g. an ink jet print head. While a single print head is shown in FIG. 2C, it is to be understood that multiple print heads may be used that spend a width of the fabrication bed 22. The print head 26 may be attached to a moving XY stage or a translational carriage (neither of which is shown) that moves the print head adjacent to the fabrication bed 22 in order to deposit the fusing agent 28 on the desired solidification portions 44.

As an example, if the first layer is to be shaped like a cube and/or cylinder, the fusing agent 28 may be deposited in a square pattern or circular pattern (from a top view), respectively, on at least a solidification portion 44 of the layer 10 of the build material 16 in the fabrication bed 22.

In some examples, the method 110 further includes determining how to selectively apply a detailing agent 29 on a detailing portion 42 of the layer 10 of the build material 16, as shown at reference numeral 114 in FIG. 1B. This determination may occur prior to actually selectively applying the detailing agent 29. Here, a detailing portion 42 is a portion of build material 16 on which a detailing agent 29 is to be applied.

In some examples, a detailing portion 42 of the layer 10 may be a portion in which the build material 16 should not fuse or coalesce. That is, the complete platform comprising fused and unfused build material 16 after printing of the 3D objects may be easier to break up along the detailing portion(s) 42.

In some examples, a detailing agent 29 may be a print agent which serves to reduce or prevent fusing of the portion of the build material 16 on which the detailing agent 29 has been applied.

The determination as to how to selectively apply the detailing agent 29 may include determining where to apply the detailing agent 29 and/or determining how much of the detailing agent 29 to apply. These determinations may be made utilizing the 3D model data, which includes the information to print the 3D objects.

In some examples, the processor of the system 12 may parse the 3D model data and evaluate an open space around and/or between the objects to be printed in the 3D model data to find vacant volumes in the 3D model data. In some examples, fracture volumes away from the objects in the vacant volume of the 3D model data are generated. In some examples, detailing portions 42 correspond to cross sections of the fracture volumes for the layer(s) 10. Here, "detailing portion" corresponds to the digital representation of the part in the layer 10 onto which the detailing agent is to be deposited. By actually depositing a detailing agent to these portions in the layer 10 of build material 16 in the fabrication bed 22, a detailing portion is generated.

In some examples, one object is to be printed. The processor may evaluate an open space around the object and generate a fracture volume spaced apart from and at least partially surrounding the object to be printed. In some examples, multiple objects are to be printed. The processor may evaluate an open space around and generate at least one fracture volume away from and around the objects and/or between the objects to be printed. The at least one fracture volume may not go through any of the objects to be printed. The fracture volume(s) may be spaced apart from the object(s) to be printed.

In some examples, at least one fracture volume within the vacant volumes in the 3D model data, which is spaced apart from the objects to be printed, may be generated. The cross sections of said at least one fracture volume are to contain the detailing agent. Thereby, at least one detailing portion 42 of the build material 16 is generated. In some examples, the detailing agent 29 may be applied selectively on the cross sections of the generated fracture volume.

In some examples, the processor may modify the print data such that the print data includes a representation of at least one fracture volume or at least one detailing portion 42 for at least one layer 10. For example, the print data may include a representation of at least one fracture volume or at least one detailing portion 42 for one layer 10 or for a number of layer(s) 10. In some examples, the print data may include a representation of at least one fracture volume or at least one detailing portion 42 for each layer 10.

In some examples, at least one print head may be controlled to receive commands from the processor and to deposit the detailing agent 29 between the cross sections of the 3D objects that are to be formed for the layer, i.e. between the solidification portions 44. The print head may selectively apply the detailing agent 29 to generate those detailing portions 42 of the layer 10 that are to be prevented from fusing. In some examples, the print head may be controlled to receive the modified print data including the detailing portions 42, such that the modified print data causes the print head to deposit the detailing agent 29 to generate the detailing portions 42.

In some examples, a detailing agent 29 may be selectively applied to generate at least one detailing portion 42 of the build material 16 in the layer 10 in the fabrication bed 22 (cf. reference 116 in FIG. 1B), as illustrated in FIG. 2D. The at least one detailing portion 42 may be spaced apart from the solidification portions 44 in the layer 10.

As used herein, the term "spaced apart" means that there is a sufficiently large distance between each solidification portion 44 and the at least one detailing portion 42, such that the build material in the at least one detailing portion 42 may not be affected by processes within the solidification portions 44, such as thermal diffusion and the resulting coalescence bleed, while the objects are printed.

Similar to the application of the fusing agent 28 explained above, the detailing agent may be dispensed from a detailing agent distributor 26', such as a print head, e.g. an ink jet print head or from multiple print heads. In some examples, the detailing agent is dispensed from the same print head 26 or multiple print heads as the fusing agent 28. In some other examples, a different print head 26' or multiple different print heads are provided from which the detailing agent may be dispensed. The print head 26' may also be attached to a moving XY stage or a translational carriage (neither of which is shown) that moves the print head adjacent to the fabrication bed 22 in order to deposit the detailing agent 29 on the desired detailing portions 42. In some examples, the detailing agent 29 is applied prior to or concurrently with the fusing agent 28.

In some examples, a plurality of objects is to be printed and the at least one detailing portion 42 onto which the detailing agent 29 is applied lies between the solidification portions 44 of the build material 16 in the fabrication bed 22, which correspond to cross sections of the plurality of objects to be printed in the layer 10.

In some examples, the amount and/or positioning of the detailing agent 29 that is applied to the build material 16 in the fabrication bed 22 may be controlled. The detailing agent 29 may act as a coolant which effectively removes energy and keeps the build material 16 at a temperature that prevents fusing of the build material 16.

Figure 3:
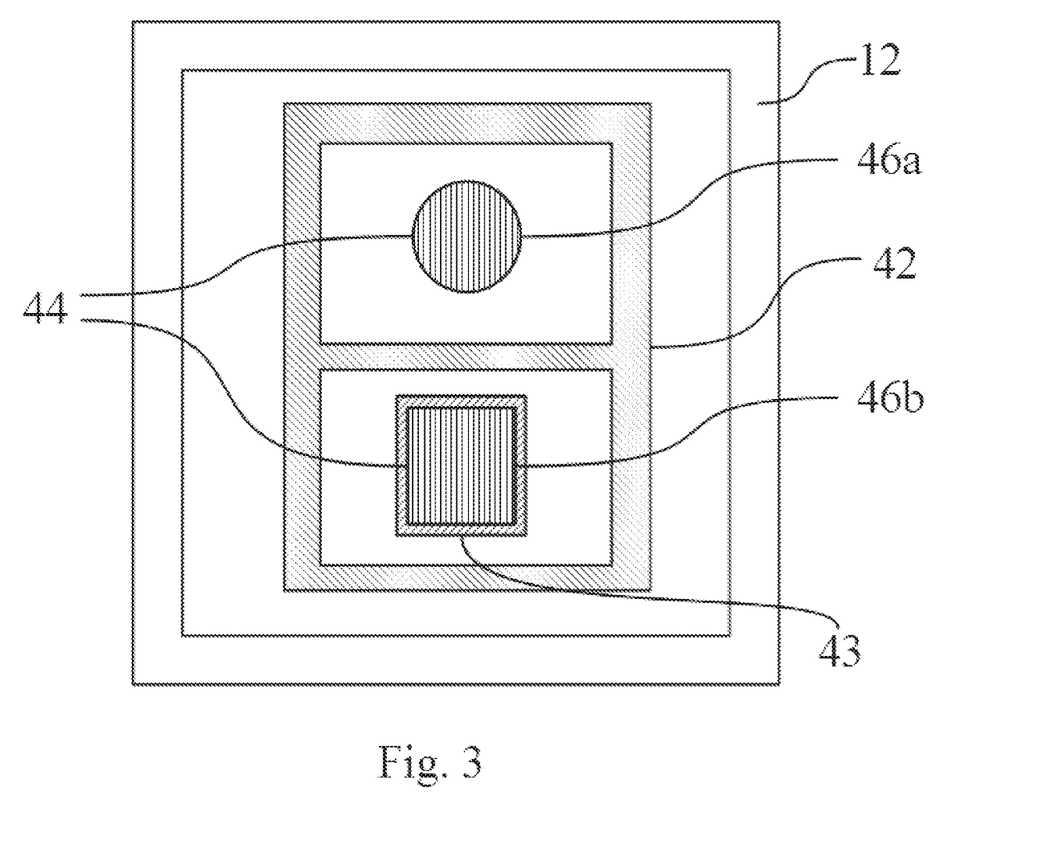
FIG. 3 is a schematic top view of an example of the build material in the fabrication bed of FIG. 2D, indicating portions on which a fusing agent is to be applied, an edge zone on which a modifying agent is to be applied and portions on which a detailing agent is to be applied thereon.

In some examples, a modifying agent may be selectively applied on edge zones 43 of the build material along the contours of the solidification portions 44 of the build material in the layer 10, as shown in FIG. 3. In some examples, the modifying agent may reduce or prevent fusing of the build material within the edge zones when it is exposed to a radiation.

Here, an example of a modifying agent may serve to reduce the degree of coalescence, or prevent coalescence, of a portion of the build material on which the modifying agent has been applied or which the modifying agent has penetrated. In some examples, the modifying agent may evaporate and, thus, remove energy from the build material when the build material has been heated.

In some examples, the modifying agent may comprise at least one of an inorganic salt, a surfactant, a co-solvent, a humectant, a biocide, and water. In some examples, the modifying agent may reduce or prevent fusing of the portion of the build material which is in contact with the modifying agent.

In some examples, edge zones are narrow portions of build material 16 in the layer 10 in the fabrication bed 22, which follow along the contours of the solidification portions 44. Here, "narrow" may mean that the width of the edge zone is generally smaller than (or at most equal to) the width of the corresponding solidification portion.

In some instances, it has been found that while the layer 10 of build material 16 is exposed to radiation, thermal energy may propagate from the solidification portions into the surrounding material. This may result in the subsequent solidification of area(s) of the build material that were not intended to be solidified. This effect is referred to herein as coalescence bleed. Coalescence bleed may result in, for example, a reduction in the overall dimensional accuracy of the printed 3D objects and/or dimensional growth. For example, the edge of the objects may be rough or undefined. The effected of coalescence bleed may be prevented or diminished by applying a modifying agent along the edge of the objects to be printed, thereby preventing the build material along this edge, i.e. in the edge zone, to fuse.

That is, in some examples, the modifying agent prevents fusing of the build material 16 in narrow edge zones 43 along the contours of the solidification portions 44, i.e. around the periphery of the object(s) to be printed. In some examples, this may enhance the edge details of the object(s) to be printed.

In the example shown in FIG. 3, two different objects are to be printed. Here, one object is shaped like a circular cylinder, whereas the other object is shaped like a rectangular prism. FIG. 3 schematically shows a top view of the layer 10 of the build material 16 in the fabrication bed 22. The cross sections 46a and 46b of the two objects to be printed have a circular and a rectangular shape, respectively.

In some examples, the cross sections 46a and 46b may correspond to patterns of, e.g. a fusing agent to applied to the layer 10 of the build material 16. In some examples, these patterns may be defined in print data which has been received, in some examples, these patterns are based on a 3D model of the objects to be printed (cf. FIG. 1A).

In some examples, these cross sections of the 3D objects to be printed in the layer 10 correspond to solidification portions 44 for the layer 10 onto which a fusing agent 28 may be deposited. As indicated in FIG. 3, a detailing portion 42 is determined in the open space between the solidification portions or cross sections 46a and 46b, i.e. between the objects to be printed. In some examples, a detailing agent 29 may be applied to the detailing portion 42.

In some examples, the detailing portion 42 may correspond to a region which is distant from the patterns corresponding to cross sections 46a and 46b. In some examples, a further pattern corresponding to the detailing portion 42 has been added to modified pint data. In some examples, the modified print data is to control print heads to selectively apply a detailing agent on the detailing portion 42.

In some examples, the detailing portion(s) 42 of the layer(s) 10 of build material 16 may generate fracture regions in the processed volume of build material.

Further, in FIG. 3 an edge zone 43 follows the contour of the rectangular shaped cross section 46b. In some examples, a modifying agent may be applied to the edge zone 43.

After the detailing agent 29 is applied to the detailing portion and, in some examples, the fusing agent 28 is applied to the solidification portions, respectively, the entire layer 10 of the build material 16 in the fabrication bed 22 or at least a portion thereof is exposed to radiation R, such as, e.g. infrared or near infrared radiation. This is shown at reference 118 in FIG. 1B and in FIG. 2E.

Figure 2E:
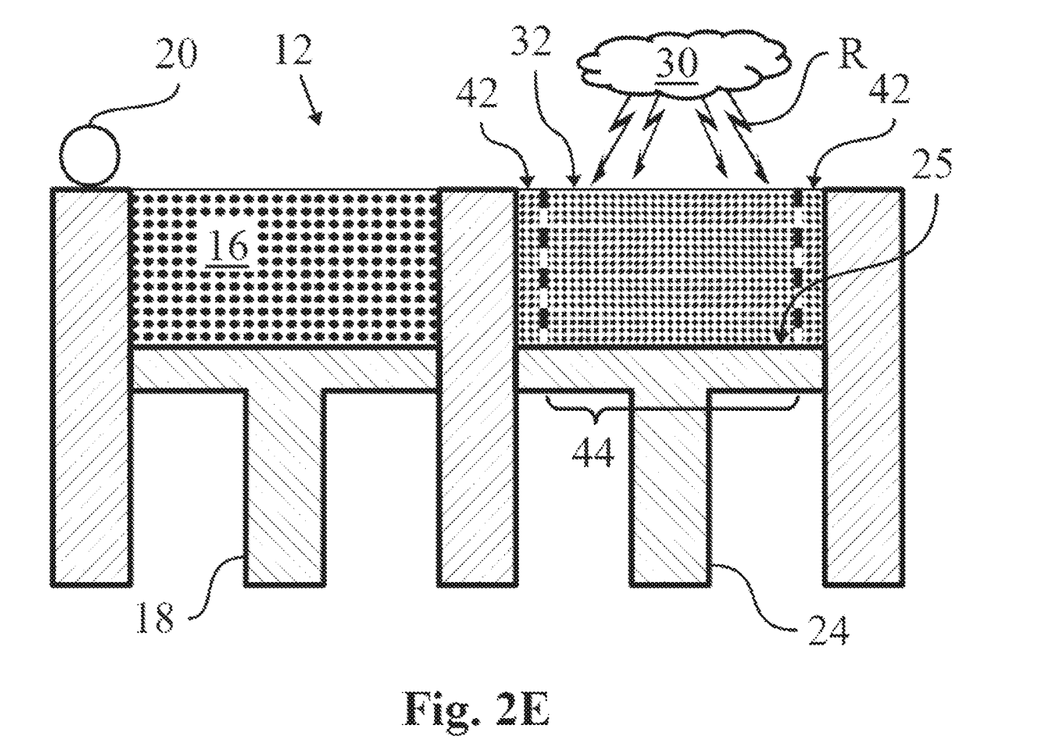

The infrared or near infrared radiation R may be emitted from a sintering source 30, such as an IR or near IR fusing lamp, IR or near IR light emitting diodes (LED), or lasers with IR wavelengths. The sintering source 30 may be attached, for example, to a carriage that also holds the print head 26, 26'. The carriage may move the sintering source 30 into a position that is adjacent to the fabrication bed 22. The sintering source 30 may be controlled to receive commands from the central processing unit, e.g. the processor, and to expose the layer 10 and, in some examples, the fusing agent 28 to IR or near IR radiation R.

In some examples, the radiation source 30 may be to expose the solidification portions 44 of the layer 10 of the build material 16 to radiation R.

In some examples, the radiation R emitted by the sintering source 30 may have a shorter wavelength than IR or near IR light. For example, the radiation R emitted from radiation source 30 may be visible light, or UV or near UV light. The radiation source 30 used will depend, at least in part, on the type of build material 16 and, in some examples, on the type of fusing agent 28 that is used. The length of time the radiation R is applied for, or energy exposure time, may be dependent, for example, on a number of: characteristics of the radiation source 30, characteristics of the build material 16, and/or characteristics of the fusing agent 28.

In some examples, the exposure to the radiation R may result in fusing of the build material in the fabrication bed within the solidification portions, thereby hardening the appropriate layer of the three-dimensional object to be printed. In some examples, the fusing agent 28 enhances the absorption of the radiation R, converts the absorbed radiation R to thermal energy, and promotes the transfer of the thermal energy to the build material 16 in proximity thereof (i.e., the build material 16 within thermal contact of the fusing agent 28). In an example, the fusing agent 28 sufficiently elevates the temperature of the build material 16 in the portion 44 above the melting point, allowing fusing of the particles of the build material 16, e.g. the polymeric powder composition, to take place.

In some examples, the radiation R emitted by the radiation source 30 itself may sufficiently elevate the temperature of the build material 16 in the solidification portions above the melting point, thereby allowing fusing of the build material 16 in the fabrication bed 22 to take place. Thus, exposure to radiation R forms one layer of the three-dimensional object to be formed.

In some examples, the completed platform may comprise the 3D objects to be printed, which are formed from the fused material 16 within the solidification portions 44 of the layers 10, and the unfused fracture volumes formed from the material 16 within the detailing portions 42 of the layers 10 onto which the detailing agent 29 has been deposited. The completed platform may further comprise the remaining unfused, but also untreated material 16 within the remaining portions of the layers 10. The unfused but untreated build material may be more cohesive than the unfused material onto which the detailing agent has been deposited. For example, the unfused but untreated build material may be in the form of a sticky chunk or sticky chunks of build material which, in some cases, are referred to as powder cake.

In some examples, the build material 16 in the at least one detailing portion 42 in the layer 10, that has the detailing agent 29 applied thereto, does not absorb sufficient energy from the radiation R to elevate the temperature of the build material 16 above the melting point. In some examples, the build material 16 in the at least one detailing portion 42 does not absorb sufficient energy during preheating to form a powder cake. For example, the detailing agent 29 may diffuse the absorbed energy to the adjacent build material 16 in the fabrication bed 22 more slowly, and evaporation of the detailing agent 29 removes energy. As such, in these instances, the particles of the build material 16 within the at least one detailing portion 42 generally do not exceed the melting point of the build material 16 and do not fuse or form a powder cake.

Thereby, in some examples the detailing agent 29 may at least partially prevent fusing or caking of the build material 16 in the fabrication bed 22 within the at least one detailing portion 42. Thereby, spaces between the printed objects in the completed platform may be created, in which the build material may be less cohesive than the untreated build material 16 within the remaining other parts of the completed platform. This way, the breakability of the build material 16 along the detailing portions may be enhanced.

It is to be understood that, in some examples, the completed platform of fused and unfused build material may be too warm to be immediately further processed after the 3D objects have been printed. Thus, in some examples, the completed platform may have to cool down before it can be further processed, in particular, before the printed 3D object(s) can be removed from the platform.

In some examples, the spaces between the printed objects in the completed platform, in which the build material treated with detailing agent is less cohesive than the untreated build material within the remaining other parts of the completed platform, may define fracture volumes. Thus, fractures within these fracture volumes may be formed, which enable the passage of cool air through or on the completed platform. Such a fractured platform may have a larger surface area to volume ratio than an unfractured platform. In some examples, this may enable faster cooling of the completed platform.

Figure 2F:
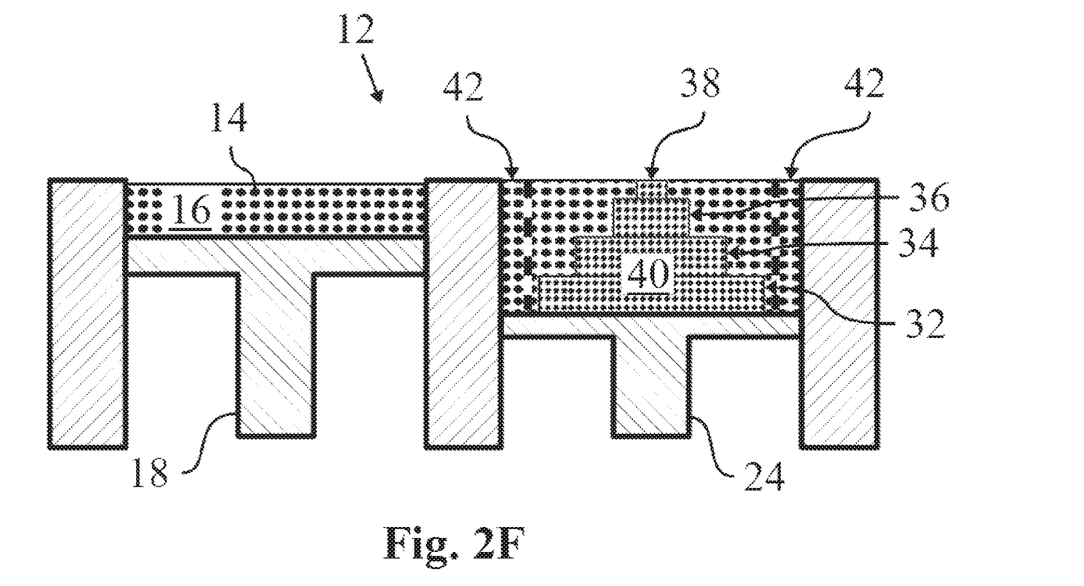

FIG. 2F illustrates one example of a three-dimensional object 40 in the fabrication bed 22. It is to be understood, however, that the subsequently formed layers 34, 36, 38 may have any shape and/or thickness and may be the same as or different from any other layer 32, 34, 36, 38 depending upon the size, shape, etc. of the 3D object 40 that is to be formed.

As illustrated in FIG. 2F, as subsequent layers 34, 36, 38 have been formed, the delivery piston 18 is pushed closer to the opening of the delivery bed 14, and the supply of the build material 16 in the delivery bed 14 is diminished (compared, for example, to FIG. 2A at the outset of the method). The fabrication piston 24 is pushed further away from the opening of the fabrication bed 22 in order to accommodate the subsequent layers of build material 16 in the fabrication bed 22, the selectively applied fusing agent 28, and the selectively applied detailing agent 29. Since at least some of the build material 16 in the fabrication bed 22 remains unfused after each layer 32, 34, 36, 38 is formed, the three-dimensional object 40 is at least partially surrounded by the unfused build material 16 and detailing agent 29 in the fabrication bed 22.

In some examples, references 112 through 118 of FIG. 1B (shown and described in reference to FIGS. 2A through 2F) may be repeated a number of times to create subsequent layers 34, 36, 38 (FIG. 2F) and to ultimately form the three-dimensional object 40. It is to be understood that the heat absorbed during the application of radiation R from the solidification portions 44 of the build material 16 in the fabrication bed 22, on which, in some examples, fusing agent 28 has been delivered, may propagate to a previously solidified layer, such as layer 32, causing at least some of that layer to heat up above its melting point. This effect helps create strong interlayer bonding between adjacent layers of the three-dimensional object 40.

When the 3D object 40 is complete, it may be removed from the fabrication bed 22, and the unfused build material 16 and detailing agent 29 may be separated from one another.

In some examples, when a plurality of 3D objects 46a and 46b are to be printed, these objects may be separated from one another after completion by breaking up the platform of build material 16 along the detailing portions. As explained above, the detailing agent 29, which is deposited onto the detailing portions, prevents the build material 16 in the detailing portions from fusing and renders the build material 16 in the detailing portions less cohesive than untreated build material, thereby enhancing the breakability of the build material 16 along the detailing portions.

In some examples, a plurality of 3D objects may be printed on top of each other. For example, a spherical object may be printed on top of a cubical object within one platform of build material 16 in the fabrication bed 22. Thus, in a first number of layers 10a, 10b, 10c, etc. the solidification portions will have a circular shape, corresponding to the cross sections of the spherical three-dimensional object to be printed. However, in a subsequent number of layers 10k, 10l, 10m, etc. the solidification portions will have a rectangular or square shape, corresponding to the cross sections of the cubical object to be printed.

In these examples, the detailing portion may be determined by evaluating the open space between the two objects to be printed, i.e., the open space between the first number of layers 10a, 10b, 10c, etc. and the subsequent number of layers 10k, 10l, 10m, etc. The detailing agent 29 may then be applied on an entire layer 10f or a number of entire layers 10f, 10g, 10h, etc. which lies between the first number of layers 10a, 10b, 10c, etc. and the second number of layers 10k, 10l, 10m, etc.

The two objects to be printed, i.e., the spherical object and the cubical object, may then be separated after completion by breaking up the platform of build material 16 along the layer 10f or the layers 10f, 10g, 10h, etc. onto which the detailing agent 29 has selectively been applied which correspond to the detailing portions.

Figure 4:
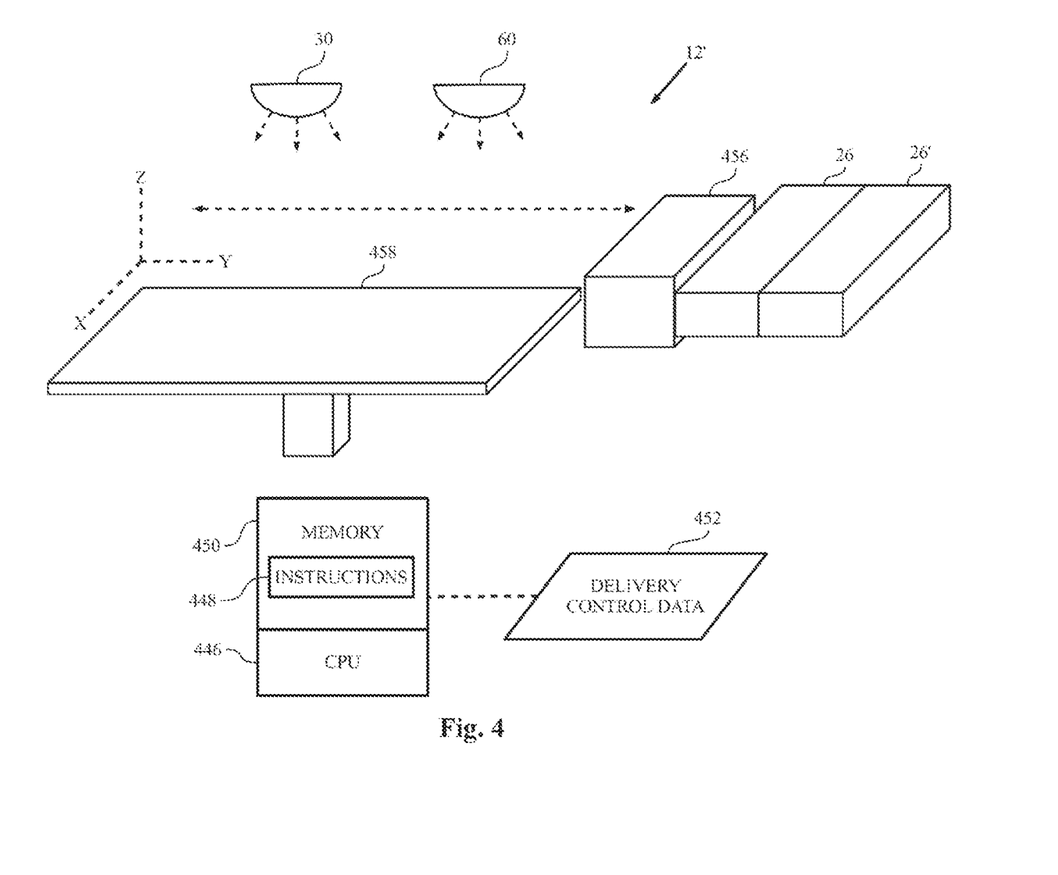
FIG. 4 is a simplified isometric view of an example of a 3D printing system that may be used in an example of a 3D printing method disclosed herein.

Referring now to FIG. 4, another example of the printing system 12' is depicted. The system 12' may include a central processing unit 446 that controls the general operation of the additive printing system 12'. As an example, the central processing unit 446 may be a microcentral processing unit-based controller that is coupled to a memory 450, for example via a communications bus (not shown). As another example, the central processing unit 446 may be any kind of computer processor. The memory 450 may store the computer readable instructions 448. The central processing unit 446 may execute the instructions 448, and thus may control operation of the system 12' in accordance with the instructions 448.

In this example, the printing system 12' may include a fusing agent distributor 26 to selectively deliver fusing agent 28 to solidification portion(s) 44 of the layer (not shown in this figure) of build material 16 provided on a support member 458. In some examples, the printing system 12' also includes a detailing agent distributor 26' to selectively deliver detailing agent 29 to detailing portion(s) 42 of the layer (not shown in this figure) of build material 16 provided on a support member 458.

The central processing unit 446 controls the selective delivery of the fusing agent 28 and the detailing agent 29 to the layer of the build material 16 in accordance with delivery control data 452.

As shown in FIG. 4, each of the distributors 26, 26' may have a length that enables it to span the whole width of the support member 458 in a page-wide array configuration. In an example, the page-wide array configuration is achieved through a suitable arrangement of multiple print heads. In another example, the page-wide array configuration is achieved through a single print head with an array of nozzles having a length to enable them to span the width of the support member 458. In other examples of the printing system 12', the distributors 26, 26' may have a shorter length that does not enable them to span the whole width of the support member 458.

While not shown in FIG. 4, it is to be understood that the distributors 26, 26' may be mounted on a moveable carriage to enable them to move bi-directionally across the length of the support member 458 along the illustrated y-axis. This enables selective delivery of the fusing agent 28 and detailing agent 29 across the whole width and length of the support member 458 in a single pass. In other examples, the distributors 26, 26' may be fixed while the support member 458 is to move relative thereto.

As used herein, the term 'width' generally denotes the shortest dimension in the plane parallel to the X and Y axes shown in FIG. 4, and the term 'length' denotes the longest dimension in this plane. However, it is to be understood that in other examples the term 'width' may be interchangeable with the term 'length'. As an example, the distributors 26, 26' may have a length that enables it to span the whole length of the support member 458 while the moveable carriage may move bi-directionally across the width of the support member 458.

In examples in which the distributors 26, 26' have a shorter length that does not enable them to span the whole width of the support member 458, the distributors 26, 26' may also be movable bi-directionally across the width of the support member 458 in the illustrated x-axis. This configuration enables selective delivery of the fusing agent 28 and detailing agent 29 across the whole width and length of the support member 458 using multiple passes. The distributors 26, 26' may respectively include therein a supply of the fusing agent 28 and detailing agent 29, or may be respectively operatively connected to a separate supply of the fusing agent 28 and detailing agent 29.

As shown in FIG. 4, the printing system 12' also includes a build material distributor 456. This distributor 456 is used to provide the layer (e.g., layer 10) of the build material 16 on the support member 458. Suitable build material distributors 456 may include, for example, a wiper blade, a roller, or combinations thereof.

The build material 16 may be supplied to the build material distributor 456 from a hopper or other suitable delivery system. In the example shown, the build material distributor 456 moves across the length (y-axis) of the support member 458 to deposit a layer of the build material 16. As previously described, a first layer of build material 16 will be deposited on the support member 458, whereas subsequent layers of the build material 16 will be deposited on a previously deposited (and solidified) layer.

It is to be further understood that the support member 458 may also be moveable along the z-axis. In an example, the support member 458 is moved in the z-direction such that as new layers of build material 16 are deposited, a predetermined gap is maintained between the surface of the most recently formed layer and the lower surface of the distributors 26, 26'. In other examples, however, the support member 458 may be fixed along the z-axis and the distributor 26 may be movable along the z-axis.

Similar to the system 12, the system 12' also includes the radiation source 30 to apply radiation R to the deposited layer of build material 16 to cause the solidification of solidification portion(s) 44 of the build material 16, on which, in some examples, the fusing agent 28 has been applied. Any of the previously described radiation sources 30 may be used. In an example, the radiation source 30 is a single radiation source that is able to uniformly apply radiation to the deposited materials, and in another example, radiation source 30 includes an array of radiation sources to uniformly apply radiation to the deposited materials.

In the examples disclosed herein, the radiation source 30 is to apply radiation in a substantially uniform manner to the whole surface of the deposited build material 16. This type of radiation source 30 may be referred to as an unfocused radiation source. Exposing the entire layer to energy simultaneously may help increase the speed at which a 3D object may be generated.

While not shown, it is to be understood that the radiation source 30 may be mounted on the moveable carriage or may be in a fixed position.

The central processing unit 446 may control the radiation source 30. The amount of energy applied may be in accordance with delivery control data 452.

The system 12' may also include a pre-heater 60 that is used to pre-heat the deposited build material 16 (as shown and described in reference to FIG. 2B). The use of the pre-heater 60 may help reduce the amount of energy that has to be applied by the radiation source 30.

It is to be understood that the examples disclosed herein are provided for illustrative purposes and are not to be construed as limiting the scope of the present disclosure.

What is claimed is:

1. A three-dimensional (3D) printing method, comprising:
   receiving print data defining patterns of at least one agent to be applied to a layer of build material, wherein the patterns are at least partially based on a 3D model of at least one object to be generated;
   processing the print data to determine regions which are distant from said patterns, wherein the distant regions are blank regions without patterns of the at least one agent to be applied to the layer of build material;
   modifying the print data to add a further pattern of a detailing agent to be selectively applied to the layer of build material to generate fracture regions in a processed volume of build material, the fracture regions to facilitate removal of a fabricated part from a powder cake; and
   based on the modified print data, applying a fusing agent and the detailing agent to the layer of build material and exposing the build material to radiation to form the fabricated part in a powder cake that comprises the fracture regions.

2. The method of claim 1, further comprising
   selectively applying the fusing agent on at least one pattern defined in the print data to generate at least one solidification portion of the build material corresponding to at least one cross section of the at least one object;
   selectively applying the detailing agent on said further pattern, wherein said further pattern comprises at least one detailing portion of the build material; and exposing the build material to the radiation, wherein the fusing agent absorbs the radiation and converts the absorbed radiation to thermal energy, thereby at least partially fusing the at least one solidification portion of the build material in proximity of the fusing agent when exposed to the radiation;

wherein the detailing agent at least partially prevents the build material in the at least one detailing portion to coalesce, thereby creating spaces where the build material is less cohesive than untreated build material, such that the breakability of the build material along the at least one detailing portion is enhanced.

3. The method of claim 2, further comprising:

selectively applying a modifying agent on at least one edge zone of the build material, wherein said at least one edge zone is along contours of the at least one solidification portion of the build material, whereby the modifying agent reduces or prevents fusing of the at least one edge zone of the build material when exposed to the radiation.

4. The method of claim 2, further comprising determining how to selectively apply the detailing agent on the at least one detailing portion of the build material by:

evaluating an open space around the at least one object to find vacant volumes in the 3D model data; and generating at least one fracture volume within the vacant volumes in the 3D model, which is spaced apart from the at least one object, wherein the cross sections of the fracture volume is to contain the detailing agent, thereby generating the at least one detailing portion of the build material.

5. The method of claim 4, further comprising modifying the 3D model data to include the at least one fracture volume and the at least one detailing portion of the build material.

6. The method of claim 4, wherein the selectively applying the detailing agent on the at least one detailing portion of the build material includes selectively applying the detailing agent on the cross sections of the generated at least one fracture volume.

7. The method of claim 1, wherein the build material is one of a powder, a liquid, a paste or a gel or a composition thereof.

8. The method of claim 7, wherein the build material is a powder or powder composition comprising powder particles of multiple different sizes.

9. The method of claim 1, wherein the fusing agent comprises a water-based dispersion including a radiation absorbing binding agent.

10. The method of claim 9, wherein the fusing agent further includes at least one of a surfactant, a biocide, a gloss enhancing agent, a pigment, and/or combinations thereof.

11. The method of claim 1, wherein a plurality of objects is to be generated and the detailing agent is applied on at least one detailing portion of the build material, which lies between the solidification portions corresponding to the cross sections of the objects to be generated.

12. The method of claim 11, wherein the plurality of objects to be generated are to be formed on top of each other based on the 3D model.

13. The method of claim 1, wherein the build material is applied on a contact surface.

14. The method of claim 1, further comprising fracturing the fracture regions to remove a fabricated part from a build volume comprising a powder cake.

15. The method of claim 1, wherein the detailing agent reduces caking of the fracture region during forming of the fabricated part.

16. The method of claim 1, wherein the detailing agent cools the fracture regions reducing consolidation of material in the fracture zone.

17. The method of claim 1, further comprising fracturing the fracture regions to increase cooling of the fabricated part.

18. A three-dimensional (3D) printing system, comprising a processor;

wherein the processor is to control the receiving of print data defining patterns of at least one agent to be applied to a layer of build material, wherein the patterns are at least partially based on a 3D model of at least one object to be generated;

processing of the print data to determine regions which are distant from said patterns, wherein the distant regions are blank regions without patterns of the at least one agent to be applied to the layer of build material;

modifying of the print data for the regions to add a further pattern of a detailing agent to be selectively applied to the layer of build material to generate fracture regions in a processed volume of build material; and based on the modified print data, applying a fusing agent and the detailing agent to the layer of build material and exposing the build material to radiation to form the processed volume of build material including a fabricated part in a powder cake that comprises the fracture regions.

19. A non-transitory computer readable medium for storing a program causing a processor to perform a method of three-dimensional (3D) printing, comprising:

receiving print data defining patterns of at least one agent to be applied to a layer of build material, wherein the patterns are at least partially based on a 3D model of at least one object to be generated;

processing the print data to determine regions which are distant from said patterns, wherein the distant regions are blank regions without patterns of the at least one agent to be applied to the layer of build material;

modifying the print data to add a further pattern of a detailing agent to be selectively applied to the layer of build material to generate fracture regions in a processed volume of build material, wherein the processed volume of build material comprises a powder cake of build material and the fracture regions facilitate removal of the powder cake from a 3D printed object; and outputting the modified print data to a process forming a fabricated part by, based on the modified print data, applying a fusing agent and the detailing agent to the layer of build material and exposing the build material to radiation to form the fabricated part in a powder cake that comprises the fracture regions.

20. The printing system of claim 18, wherein the blank regions form the powder cake when printed and the fracture regions are less consolidated than the powder cake to facilitate removal of the powder cake from the fabricated part.

* * * * *